United States Patent [19]

Koschmann

[11] 4,197,070
[45] Apr. 8, 1980

[54] APPARATUS FOR CONTROLLING A PLASTIC EXTRUDER

[75] Inventor: John E. Koschmann, Northwood, Ohio

[73] Assignee: Owens-Illinois, Inc., Toledo, Ohio

[21] Appl. No.: 930,625

[22] Filed: Aug. 3, 1978

[51] Int. Cl.² .............................. B29F 1/00; B29F 3/08
[52] U.S. Cl. .................................. 425/135; 264/40.3; 264/40.6; 366/79; 366/142; 366/145; 425/143; 425/161; 425/162
[58] Field of Search .......................... 366/79, 142, 145; 425/145, 135, 144, 161, 162, 143; 264/40.3, 40.6

[56] References Cited

U.S. PATENT DOCUMENTS

| 3,698,844 | 10/1972 | Grimm | 425/144 |
| 3,733,059 | 5/1973 | Petit | 425/133 |
| 3,822,867 | 7/1974 | Evans | 425/144 |
| 3,924,840 | 12/1975 | Nelson | 9/9 |

OTHER PUBLICATIONS

"Technical Data Sheet", by Harvel, Inc., TDS-247.

Primary Examiner—Jay H. Woo
Attorney, Agent, or Firm—Richard D. Heberling

[57] ABSTRACT

A control system for a plastic extruder which automatically controls both the melt pressure and the melt temperature of the plastic material at the outlet of the extruder barrel. The extruder barrel is divided into a plurality of heating zones and a zone temperature control means individually controls the temperature of each zone in accordance with predetermined zone temperature set points. A melt temperature control means automatically adjusts certain zone temperature set points such that the actual melt temperature is maintained at its desired value. The speed of a rotatable extruder screw is controlled by a melt pressure control means such that the actual melt pressure is maintained at its desired value. In accordance with the present invention, a separate feedforward controller and separate feedback controller are provided in the melt temperature control loop and in each zone temperature control loop such that independent specification of set point and disturbance responses can be achieved. Also, the melt temperature control means and the melt pressure control means are each provided with an interaction controller such that the interactions between melt temperature and melt pressure are minimized.

18 Claims, 4 Drawing Figures

APPARATUS FOR CONTROLLING A PLASTIC EXTRUDER

BACKGROUND OF THE INVENTION

1. Field of the Invention

The present invention relates in general to a control system for a plastic extruder and in particular to a control system for a plastic extruder which automatically controls both the pressure and the temperature of the extruded material.

2. Description of the Prior Art

Plastic extruders typically comprise a rotatable screw which is mounted in an extruder barrel having a hopper positioned at one end for receiving a plastic material such as a polymer in the form of solid pellets or chips. The rotatable screw functions to move the plastic material through the barrel which is typically divided into a plurality of heating zones. As the polymer is moved through the several heating zones of the barrel, the heated barrel walls and the frictional heat from the rotating screw cause the polymer to change from the solid state to the molten state. The molten material is then forced through a die which forms the material into the desired shape. The formed material can then be subjected to subsequent forming operations. For example, a polymer which is extruded in the shape of a tube can then be subjected to blow molding operations to form a plastic bottle.

When extruding certain materials, the temperatures along the extruder must be accurately controlled in accordance with properties of the particular polymer and of the extruder. Properties of the extruders include the type of feeder screw, the speed of the screw, the length of the barrel, etc. If the temperatures are not accurately controlled, the molten polymer will not be uniform and may decompose as a result of excessive temperatures.

One important operating parameter of an extruder is the melt temperature, the temperature of the molten material at the outlet of the barrel. The melt temperature is one indicator of the viscosity of the molten material and should remain constant for quality extrusions. Another important operating parameter of an extruder is the melt pressure, the pressure of the molten material at the outlet of the barrel. It is well known that, if the material composition remains the same, the output rate of the extruded material can be controlled by maintaining the melt temperature and melt pressure at constant values. The melt pressure is typically controlled by controlling the speed of the extruder screw while the melt temperature is controlled by regulating the temperature of each heating zone. Accurate control of both the melt temperature and the melt pressure is desirable as these parameters affect the quality and dimensional tolerances of the extruded material and the initial usage of raw material.

Initially, plastic extruders were controlled by manual adjustments. An extruder operator would attempt to manipulate extruder screw speed and extruder barrel temperatures such that a desired operating point could be achieved. An operating point of a plastic extruder can be defined as an amount of material output per unit time at a certain material temperature. Later, thermostatic controllers were utilized to help regulate barrel zone temperature. However, the quality of the extruded material of manually controlled extruders was highly dependent on the skill of the operator while thermostatic controllers did not give the high degree of control which was necessary for some materials.

Some of the disadvantages of manual or thermostatic control systems were overcome by an automatic temperature control system as disclosed in U.S. Pat. No. 3,698,844 to Erimm. In this system, separate temperature transducers sense the temperature of the material in each heating zone such that the temperature of each zone is maintained at a predetermined set point temperature. Another temperature transducer senses the melt temperature at the output of the barrel and generates a signal to an electronic controller which in turn adjusts the set points of each zone such that the sensed melt temperature equals a preselected desired melt temperature. However, in this system, if a temperature change in the barrel takes place as a result of a change in screw speed, this temperature change would not immediately be sensed by the melt temperature transducer. Thus, fluctuations in the melt temperature would occur as a result of the change in screw speed.

U.S. Pat. No. 3,733,059 to Pettit discloses an extruder temperature control system similar to the above-described Erimm system which provides accurate and prompt compensation for temperature changes in the barrel as a result of changes in screw speed. A tachometer generates a signal which varies as a function of the speed of the extruder screw. This signal is used in combination with conventional temperature set point signals to accurately maintain a constant melt temperature.

More recently, computer controlled systems have been utilized to control the operating parameters of an extruder. One such system is the CP-600 manufactured by Harrel, Inc., 16 Fitch Street, East Norwalk, Connecticut 06855. This system is capable of closed loop feedback control of such process parameters as extrudate dimension, melt pressure and melt temperature. This system senses the melt temperature and automatically adjusts the barrel zone temperature such that melt temperature will remain at the desired temperature. A pressure transducer senses the melt pressure and a control loop maintains the desired melt pressure.

One of the problems associated with the prior art extruder control systems occurs in the design of the barrel zone temperature controllers. Preferably, these controllers are designed with a high sensitivity to disturbance signals. However, when a change in a temperature set point occurs, there is a danger in saturating the zone temperature controllers as the magnitude of the temperature set point changes are generally greater than the magnitude of disturbances. Hence, the sensitivity of the controller to disturbance signals must be reduced to prevent saturation of the controllers to set point changes.

Another problem associated with the prior art extruder control systems occurs as a result of the interaction between the melt temperature controller and the melt pressure controller. For example, a change in the melt temperature typically results in undesirable fluctuations in the melt pressure while a change in the melt pressure results in undesirable fluctuations in the melt temperature.

SUMMARY OF THE INVENTION

The present invention is concerned with providing an electronic control system for a plastic extruder which automatically controls the melt temperature and the melt pressure in accordance with preselected melt temperature and melt pressure set points. The extruder barrel is divided into a plurality of heating zones and the temperature of each zone is controlled in accordance with the respective zone temperature set point. A melt temperature control loop adjusts a selected number of the zone temperature set points to maintain the melt temperature at its desired value. The melt temperature control loop and each zone temperature control loop are provided with a separate feedforward controller and a separate feedback controller. As will be discussed in the detailed description, the feedback controllers are designed to give the desired system response for disturbance signals and the feedforward controllers are designed to give the desired system response for changes in the set point signals. Thus, the two controllers provide independent specification of set point and disturbance responses and consequently eliminate the saturation problem of prior art controllers when responding to set point changes.

A melt pressure control means controls the speed of the extruder screw such that the actual melt pressure is maintained at its desired value. In accordance with the present invention, the melt pressure control means is provided with an interaction controller which generates a control signal to adjust a selected number of zone temperature set points such that fluctuations in the melt temperature as a result of changes in screw speed are minimized. Similarly, the melt temperature control means is provided with an interaction controller which generates a control signal to adjust the extruder screw speed such that the fluctuations in the melt pressure as a result of changes in the selected zone temperature set points are minimized.

Although conventional analog controllers can be utilized to implement the control system of the present invention, preferably a digital computer is used as the control means.

It is an object of the present invention to more accurately control the melt temperature and the melt pressure at the outlet of a plastic extruder barrel.

It is a further object of the present invention to minimize the interactions between the melt temperature and the melt pressure in a plastic extruder control system.

DESCRIPTION OF THE PREFERRED EMBODIMENT

Figure 1:
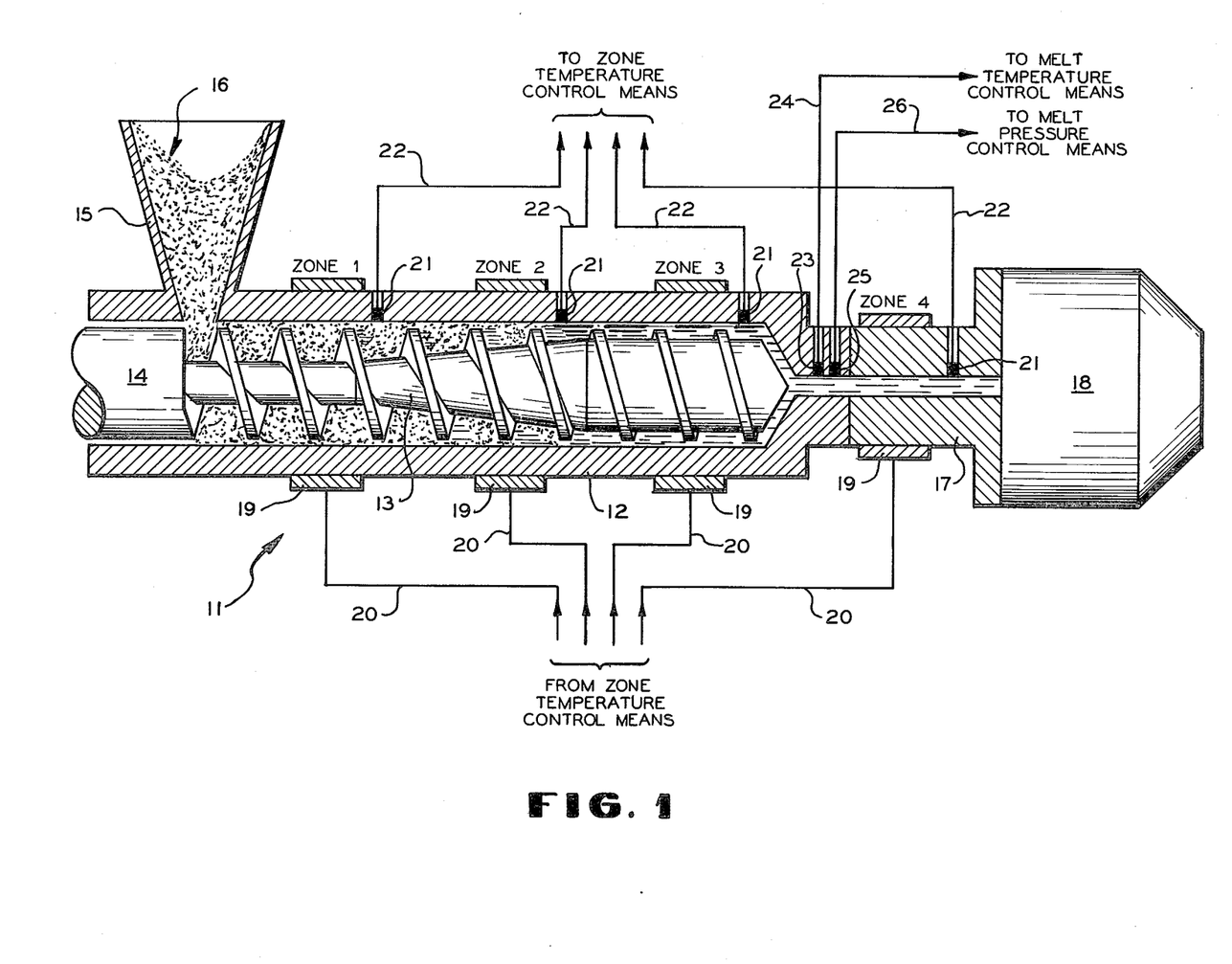
FIG. 1 is a schematic diagram of an extruder apparatus to which the present invention is applicable.

There is shown in FIG. 1 a schematic cross-sectional view of a screw type extruder 11 to which the present invention is applicable. The extruder 11 comprises a barrel 12 which encloses a helical extruder screw 13 which extends substantially along the entire inside length of the barrel 12. The screw 13 is attached to a drive shaft 14 which in turn is driven by an electric motor (not shown). A conventional gear box (not shown) may be connected between the drive shaft 14 and the motor such that the rotational speed of the screw will be substantially less than the speed of the motor. A feed hopper 15 is mounted at an input end of the barrel to receive a plastic material 16 which is typically a polymer in the form of solid pellets or chips. The material is fed by gravity and the screw advances the material toward the output end of the barrel. As the material is advanced, it is heated from a solid to a molten state.

The extruder 11 includes a die adapter section 17 at the output end of the barrel 12 for the connection of a forming die 18. The forming die is used for forming the liquid or semi-molten plastic material into the desired shape. For example, a sheet, strip, rod or tube of formed material can be extruded from the die 18.

The barrel 12 is temperature controlled such that the solid pellets in the hopper 15 will turn into a molten or workable plastic material as the pellets are moved through the barrel 12 by the screw 13. The screw is formed with a root diameter which increases toward the adapter section 17 so that the semi-molten plastic material is continuously worked as it is moved down the barrel. Thus, the plastic material is thoroughly mixed and is of uniform composition by the time it reaches the die. The viscosity of the material is sufficiently low so as to be extruded through the die 18.

The extruder barrel 12 and the adapter 17 are typically divided into a plurality of temperature controlled zones. There are four such zones shown in the schematic of FIG. 1, although more or less zones can be provided. In addition, the forming die 18 may also be temperature controlled, so that the product which is extruded from the die is at the proper temperature.

Each temperature controlled zone is provided with a separate heating element 19. The heating elements 19 are typically electrical resistance type heaters mounted in a jacket wrapped around or attached to the outside of the barrel 12 or the adapter 17. Both the barrel 12 and the adapter 17 are typically constructed of a metal having a high thermal conductivity. The heating elements 19 are connected by lines 20 to a zone temperature control means (not shown) which individually controls the temperature of each zone in accordance with predetermined set point temperatures. A separate temperature transducer 21 is suitably mounted in each temperature controlled zone to provide a signal to the zone temperature control means (not shown) on a line 22 which signal indicates the actual temperature in the respective zone.

At times, the temperature of a zone may become greater than the set point temperature, and it is necessary to extract heat from the zone such that the plastic material in the barrel will be cooled. A suitable cooling means can be a water-cooled jacket around the barrel or some means of circulating air around the barrel, such as a fan. Typically, the cooling means are only provided for the zones adjacent the output end of the barrel.

A melt temperature transducer 23 is positioned near the output end of the barrel 12 in an area adjacent the tip of the screw 13. The transducer 23 generates a signal to a melt temperature control means (not shown) on a line 24 which signal indicates the temperature of the plastic material at the barrel output. As will be discussed, this signal is utilized by the melt temperature control means to adjust certain zone temperature set points such that the melt temperature will be maintained at a predetermined melt temperature set point.

A melt pressure transducer 25 is also positioned near the output end of the barrel 12 in an area adjacent the tip of the screw 13. The transducer 25 generates a signal on a line 26 which signal indicates the pressure of the plastic material at the barrel output. This signal is supplied to a melt pressure control means which in turn adjusts the extruder screw speed such that the melt pressure will be maintained at the desired value.

Figure 2:
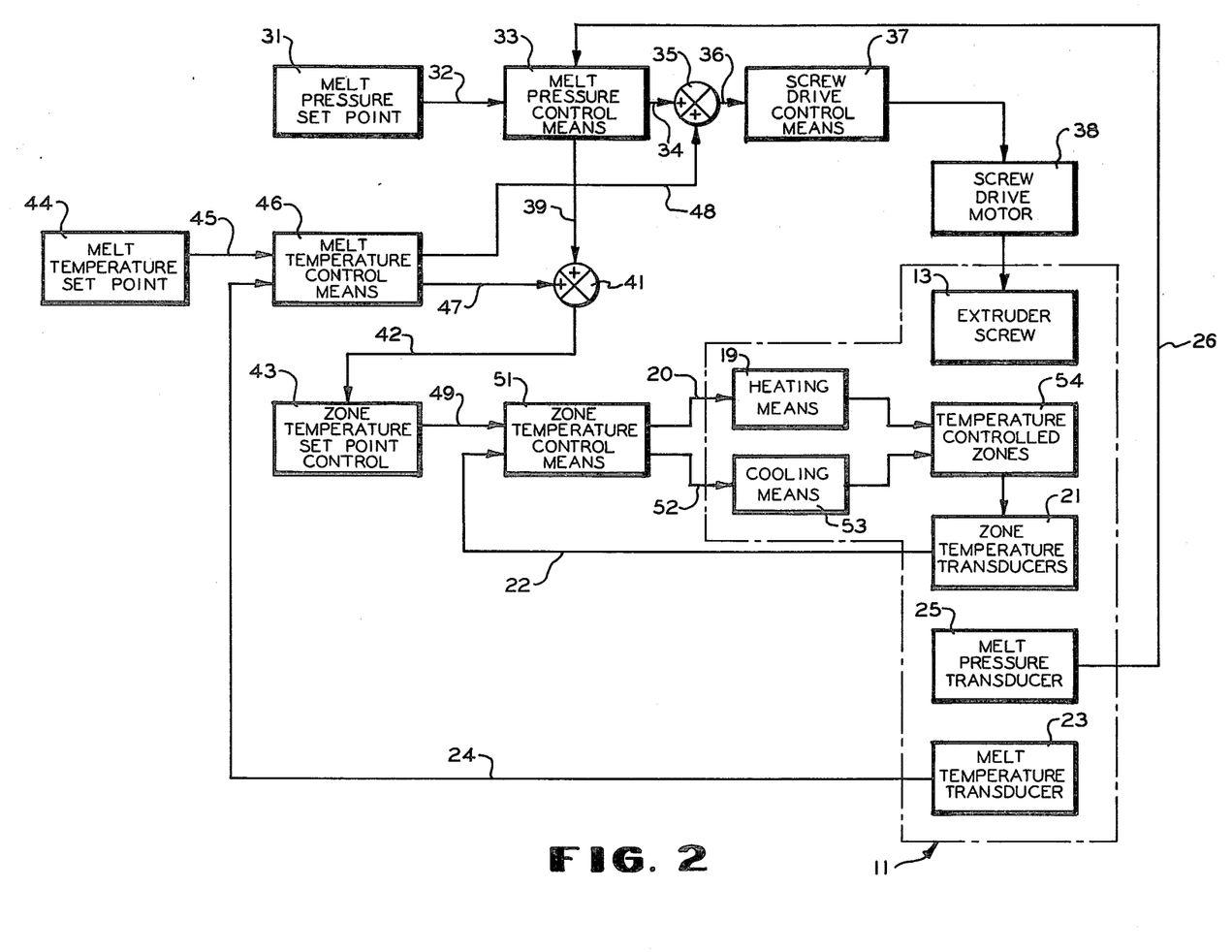
FIG. 2 is a block diagram of an extruder control system according to the present invention.

Referring to FIG. 2, there is shown a block diagram of an extruder control system according to the present invention. A melt pressure set point generator 31 is set by an operator and generates a set point signal on a line 32 to a melt pressure control means 33. The melt pressure control means 33 also receives a signal on the line 26 from the melt pressure transducer 25 which signal represents the pressure of the plastic material at the barrel output. The melt pressure control means functions to equalize the melt pressure set point and the actual melt pressure by generating a first control signal on a line 34 which is an input to a summing junction 35 having an output line 36 which is connected to a screw drive control means 37. The control means 37 is responsive to the signal on the line 36 to control the speed of a screw drive motor 38 which in turn determines the rotational speed of the extruder screw 13.

The melt pressure control means 33 also generates a second control signal on a line 39 which is an input to a summing junction 41 having an output line 42 connected to a zone temperature set point control 43. As will be discussed, the control signal on the line 39 is generated in such a manner as to minimize the fluctuations produced in melt temperature by the changes in the speed of the extruder screw.

A melt temperature set point generator 44 is set by an operator and generates a set point signal on a line 45 to a melt temperature control means 46 which signal represents the desired melt temperature. The melt temperature control means 46 also receives a signal on the line 24 from the melt temperature transducer 23 which signal represents the temperature of the plastic material at the screw tip. The melt temperature control means 46 functions to equalize the melt temperature set point and actual melt temperature by generating a first control signal on a line 47 as an input to the summing junction 41. The summing junction 41 adds the control signals on the lines 47 and 39 and generates an output signal on the line 42 to the zone temperature set point control 43. The set point control 43 responds to the signal on the line 42 to control a selected number of zone temperature set points. The set points which are not controlled by the signal on the line 42 can be manually set by the operator.

The melt temperature control means 46 generates a second control signal on a line 48 as an input to the summing junction 35. As will be discussed, the signal on the line 48 is generated in such a manner as to minimize the fluctuations in melt pressure as a result of changes in the set points of the selected zones.

The zone temperature set point control 43 generates a plurality of set point signals on a line 49 to a zone temperature control means 51. Each signal on the line 49 represents the set point temperature of a particular zone. The zone temperature control means 51 compares each set point signal on the line 49 with the respective zone temperature transducer signal generated by the zone temperature transducers 21 on the lines 22 and generates a control signal to a heating or cooling means as required. For example, heating control signals are generated on the lines 20 to the heating means 19 and cooling control signals are generated on lines 52 to cooling means 53. The heating and cooling means function to maintain the temperature controlled zones 54 at their respective set point temperatures. The zones 54 are the previously discussed zones of the extruder barrel 12 and the adapter 17 and the temperature in each zone is measured by one of the transducers 21.

Figure 3A:
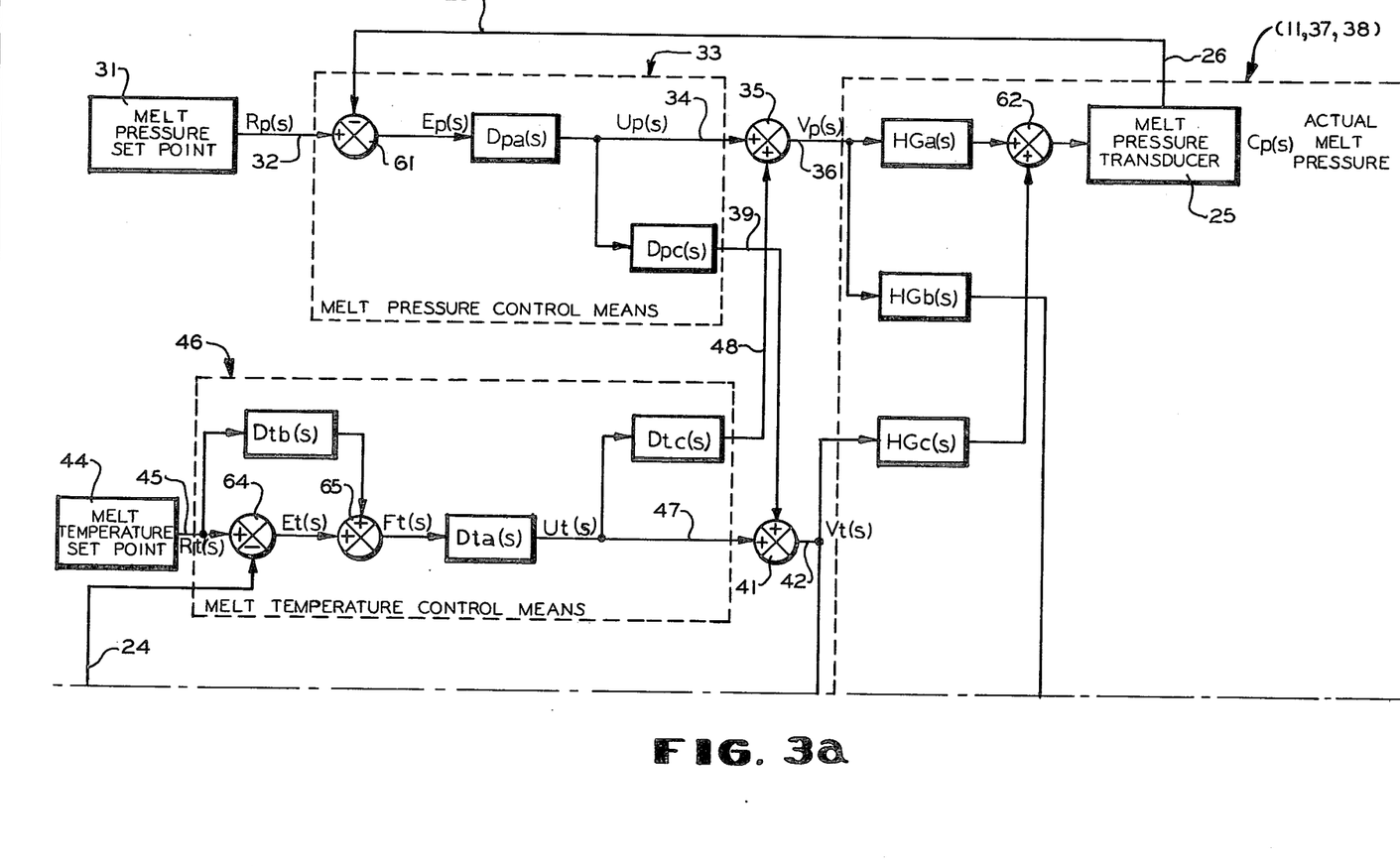
FIG. 3a and FIG. 3b are more detailed block diagrams of an extruder control system according to the present invention.
Figure 3B:
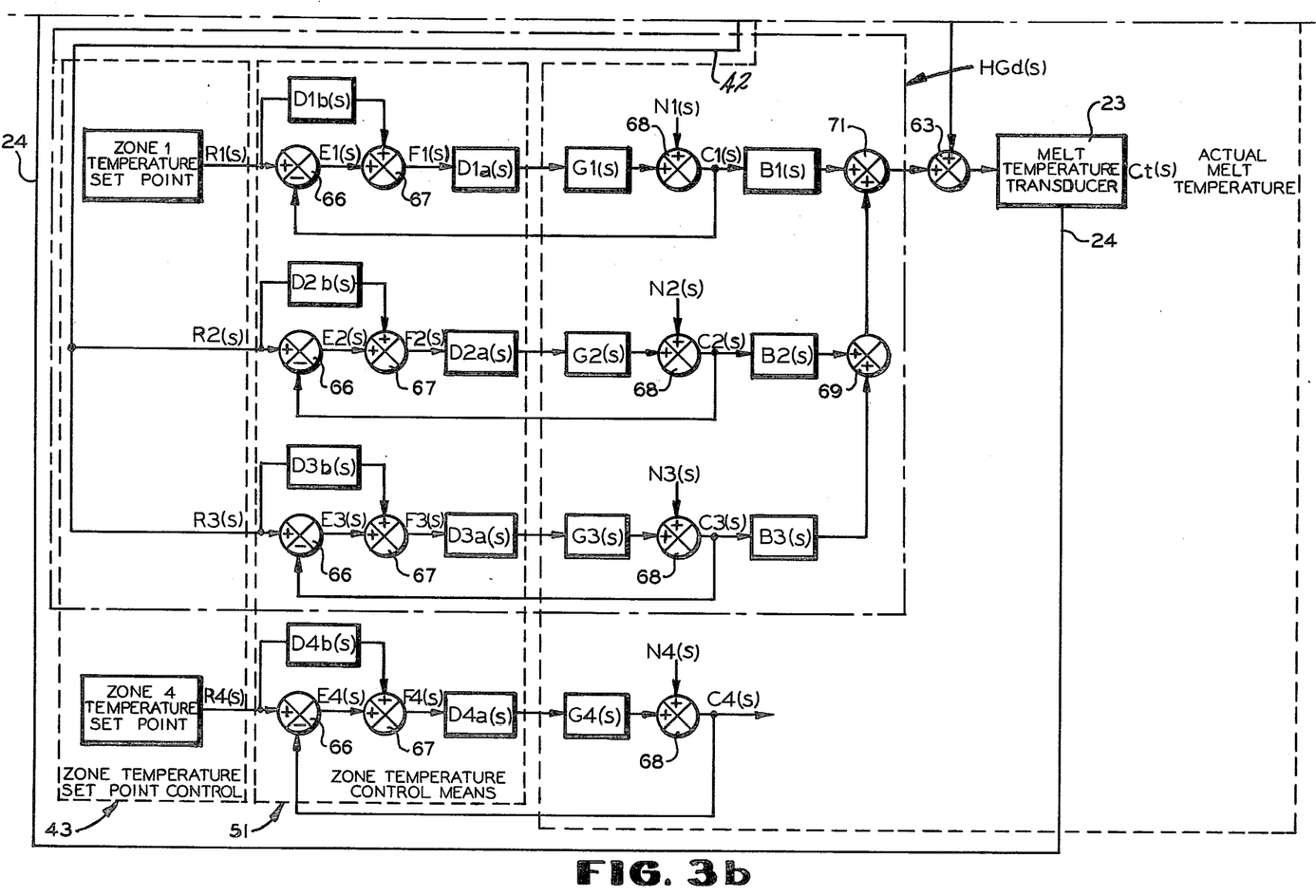

There is shown in FIG. 3a and FIG. 3b block diagrams of a quantitative mathematical model of a control system according to the present invention. The Laplace transformation will be used in the following analyses to illustrate the concepts and principles of the present invention. The Laplace transform method substitutes relatively easily solved algebraic equations for the more difficult time differential equations. The Laplace transform operators which appear in FIG. 3 are more fully defined in the following Table of Laplace Operators for FIG. 3.

| TABLE OF LAPLACE OPERATORS FOR FIG. 3 | |
|---|---|
| Operator(s) | Laplace Transform of: |
| $R_p(s)$ | Melt pressure set point input signal |
| $R_t(s)$ | Melt temperature set point input signal |
| $R_1(s)$ | Zone 1 temperature set point input signal |
| $R_4(s)$ | Zone 4 temperature set point input signal |
| $D_{tb}(s), D_{1b}(s), D_{2b}(s), D_{3b}(s), D_{4b}(s)$ | Feedforward controllers |
| $D_{pa}(s), D_{ta}(s), D_{1a}(s), D_{2a}(s), D_{3a}(s), D_{4a}(s)$ | Feedback controllers |
| $U_p(s)$ | Melt pressure feedback controller output signal |
| $U_t(s)$ | Melt temperature feedback controller output signal |
| $V_p(s)$ | Screw speed signal |
| $V_t(s) = R_2(s) = R_3(s)$ | Temperature profile signal for set points of zones 2 and 3 |
| $D_{pc}(s), D_{tc}(s)$ | Interaction controllers |
| $HG_a(s)$ | Transient relationship between the screw speed and the melt pressure |
| $HG_b(s)$ | Transient relationship between the screw speed and the melt temperature |
| $HG_c(s)$ | Transient relationship between the temperature profile for zones 2 and 3 and the melt pressure |
| $HG_d(s)$ | Transient relationship between the temperature profile for zones 2 and 3 and the melt temperature |
| $G_1(s), G_2(s), G_3(s), G_4(s)$ | Process functions for heating and cooling means |
| $B_1(s), B_2(s), B_3(s)$ | Process functions relating the actual zone temperature and the actual melt temperature |
| $C_p(s)$ | Actual melt pressure signal |
| $C_t(s)$ | Actual melt temperature signal |
| $N_1(s), N_2(s), N_3(s), N_4(s)$ | Disturbance or noise signals |
| $C_1(s), C_2(s), C_3(s), C_4(s)$ | Output signals representing actual zone temperatures |
| $E_p(s), E_t(s), E_1(s), E_2(s), E_3(s), E_4(s)$ | Error signals |
| $F_t(s), F_1(s), F_2(s), F_3(s), F_4(s)$ | Feedback controller input signals |

As shown in FIG. 3, the melt pressure control means 33 comprises a summing junction 61, a feedback controller $D_{pa}(s)$ and an interaction controller $D_{pc}(s)$. The summing junction 61 generates an error signal $E_p(s)$ to the feedback controller $D_{pa}(s)$ which signal represents the difference between the melt pressure set point signal $R_p(s)$ generated by the set point generator 31 and the actual melt pressure signal $C_p(s)$ on the line 26. The output signal $U_p(s)$ of the controller $D_{pa}(s)$ is inputted to the summing junction 35 on the line 34 and the interaction controller $D_{pc}(s)$. As will be discussed, the feedback controller Dpa(s) is designed to give the desired system response to changes in the melt pressure set point signal Rp(s) while the interaction controller Dpc(s) is designed to minimize fluctuations in melt temperature as a result of changes in screw speed.

The summing junction 35 provides an output signal Vp(s) on the line 36 which signal is representative of the extruder screw speed. The signal Vp(s) is utilized as an input to process functions HGa(s) and HGb(s). The process function HGa(s) represents the transient relationship between the screw speed and the melt pressure while the process function HGb(s) represents the transient relationship between the screw speed and the melt temperature. The output signals of the process functions HGa(s) and HGb(s) are inputs to a pair of summing junctions 62 and 63 which in turn generate output signals Cp(s) and Ct(s) respectively. The signal Cp(s) represents the actual melt pressure while the signal Ct(s) represents the actual melt temperature.

The melt temperature control means 46 includes a pair of summing junctions 64 and 65, a feedforward controller Dtb(s), a feedback controller Dta(s) and an interaction controller Dtc(s). The summing junction 64 generates an error signal Et(s) to an input of the summing junction 65 which signal represents the difference between the melt temperature set point signal Rt(s) generated by the generator 44 and the actual melt temperature signal Ct(s) on the line 24. The signal Rt(s) is also inputted to the feedforward controller Dtb(s) which generates an output signal as an input to the summing junction 65. As will be discussed, the feedforward controller Dtb(s) is designed to give the desired system response for a change in the melt temperature set point.

The output signal Ft(s) of the summing junction 65 is the sum of the error signal Et(s) and the output signal of the controller Dtb(s) and is inputted to the feedback controller Dta(s) which generates an output signal Ut(s) to the interaction controller Dtc(s) and to the summing junction 41 on the line 47. The feedback controller Dta(s) is designed to give the desired system response for disturbances in the melt temperature while the interaction controller Dtc(s) is designed to minimize fluctuations in the melt pressure as a result of changes in the temperature set points of selected zones. The interaction controller Dtc(s) generates an output signal on the line 48 to the summing junction 35 which combines this signal with the signal Up(s) on the line 34 to generate an output signal Vp(s) representing the speed of the extruder screw.

The summing junction 41 combines the signal Ut(s) on the line 47 with the output signal from the interaction controller Dpc(s) on the line 39 to generate an output signal Vt(s) on the line 42 which signal represents the temperature profile for the set points of barrel zones 2 and 3. It should be noted that, although the temperatures of zones 1, 2 and 3 affect the melt temperature, the zone 1 interaction is too large to allow the desired control such that only the zones 2 and 3 are automatically controlled in the system shown in FIG. 3a and FIG. 3b. It may be desirable in some cases to automatically control the set points of all zones affecting the melt temperature. Zone 4 is beyond the sensing points for melt temperature and pressure and, therefore, is controlled independently of the present invention.

The temperature profile signal Vt(s) is utilized as an input to process functions HGc(s) and HGd(s). The process function HGc(s) represents the transient relationship between the temperature profile and the melt pressure while the process function HGd(s) represents the transient relationship between the temperature profile and the melt temperature. The output signals of the process functions HGc(s) and HGd(s) are inputs to the summing junctions 62 and 63 respectively. The output signals of the process functions HGa(s) and HGc(s) are summed to generate the actual melt pressure Cp(s) which is sensed by the transducer 25 and generated as a feedback signal on the line 26. The output signals of the process functions HGb(s) and HGd(s) are summed to generate the actual melt temperature Ct(s) which is sensed by the transducer 23 and generated as a feedback signal on the line 24.

The zone temperature control means 51 comprises a pair of summing junctions 66 and 67, a feedforward controller and a feedback controller for each temperature controlled zone. The summing junctions 66 generate error signals (E1(s) through E4(s)) to the inputs of the summing junctions 67 which signals represent the difference between respective zone temperature set point signals (R1(s) through R4(s)) and the respective actual zone temperature signals (C1(s) through C4(s)). The zone temperature set point signals are also applied to the respective feedforward controllers (D1b(s) through D4b(s)) which function to provide the desired system response for changes in the set point signals. The summing junctions 67 combine the error signals (E1(s) through E4(s)) with the output signals of the feedforward controllers (D1b(s) through D4b(s)) to generate input signals (F1(s) through F4(s)) for the feedback controllers (D1a(s) through D4a(s)). The feedback controllers function to provide the desired system control of the heating and cooling means of the extruder 11.

A group of process functions G1(s) through G4(s) represent the processes associated with the heating and cooling means of respective zones one through four. If the heating means and cooling means can both be operating at the same time, a process function for each can be substituted for the single process function. These process functions receive an input signal from the output of the respective feedback controller and generate an output signal to a respective one of a plurality of summing junctions 68. The junctions 68 combine these output signals with any disturbance signals (N1(s) through N4(s)) which are present to generate output signals (C1(s) through C4(s)) which represent the actual temperatures of the respective zones. The actual temperature of each zone is sensed by a zone temperature transducer 21 and generated as a feedback signal on a line 22 to the summing junction 66 for the zone.

Another group of process functions B1(s), B2(s) and B3(s) represent the relationship between the actual zone temperature and the actual melt temperature. The process functions B2(s) and B3(s) receive input signals C2(s) and C3(s) respectively and generate output signals which are added at a summing junction 69. The process function B1(s) receives an input signal C1(s) and generates an output signal to a summing junction 71. This output signal is added to the output from the junction 69 to generate an output signal to the summing junction 63. The summing junction adds the HGb(s) process function output signal to the HGd(s) process function output signal. As previously stated, the output signal Ct(s) of the junction 63 represents the actual melt temperature.

The functions of the feedback controllers (Dpa(s), Dta(s), D1a(s), D2a(s), D3a(s) and D4a(s)) and the feedforward controllers (Dtb(s), D1b(s), D2b(s), D3b(s) and D4b(s)) can be clearly illustrated by examining the closed loop relationship which is present in, for example, zone 1. Observe that:

$$C1(s) = D1a(s) \cdot G1(s) \cdot F1(s) + N1(s), \quad \text{(Eq. A)}$$

$$F1(s) = R1(s) \cdot D1b(s) + E1(s) \text{ and} \quad \text{(Eq. B)}$$

$$E1(s) = R1(s) - C1(s) \quad \text{(Eq. C)}$$

Thus, by substituting Eq. C into Eq. B we obtain $$F1(s) = R1(s) \cdot D1b(s) + R1(s) - C1(s) \quad \text{(Eq. D)}$$

and then substituting Eq. D into Eq. A we obtain $$C1(s) = D1a(s) \cdot G1(s) \cdot [R1(s) \cdot D1b(s) + R1(s) - C1(s)] + N1(s) = D1a(s) \cdot G1(s) \cdot R1(s) \cdot (D1b(s) + 1) - D1a(s) \cdot G1(s) \cdot C1(s) + N1(s).$$

Hence, $$C1(s) \cdot (1 + D1a(s) \cdot G1(s)) = D1a(s) \cdot G1(s) \cdot R1(s) \cdot (D1b(s) + 1) + N1(s)$$

and $$C1(s) = \frac{D1a(s) \cdot G1(s) \cdot R1(s) \cdot (D1b(s) + 1)}{(1 + D1a(s) \cdot G1(s))} + \frac{N1(s)}{(1 + D1a(s) \cdot G1(s))} \quad \text{(Eq. E)}$$

By examining Eq. E, it is clearly seen that only the feedback controller D1a(s) affects the disturbance or noise signal N1(s). This controller can be designed to minimize the variance in the noise N1(s). After the controller D1a(s) has been designed, the controller D1b(s) can be designed such that a change in the zone 1 temperature set point R1(s) will result in the desired response. It should be noted that it is not necessary to provide a feedforward controller in the melt pressure control means 33, as there is no problem with saturating screw speed. Also, the set point response which results when the feedback controller Dpa(s) is designed for effective cancellation of disturbance signals is sufficient. Thus, the present invention provides a feedforward controller and a feedback controller in the melt temperature loop and in each zone temperature loop such that independent specification of set point and disturbance responses can be achieved.

As previously mentioned, the function of the controllers Dpc(s) and Dtc(s) is to minimize the interactions between the melt pressure and the melt temperature. This can be seen by examining the following equations which illustrate relationships shown in FIG. 3a and FIG. 3b. Observe that:

$$Cp(s) = Vp(s) \cdot HGa(s) + Vt(s) \cdot HGc(s), \quad \text{(Eq. F)}$$

$$Ct(s) = Vp(s) \cdot HGb(s) + Vt(s) \cdot HGd(s), \quad \text{(Eq. G)}$$

$$Vp(s) = Up(s) + Ut(s) \cdot Dtc(s) \text{ and} \quad \text{(Eq. H)}$$

$$Vt(s) = Up(s) \cdot Dpc(s) + Ut(s). \quad \text{(Eq. J)}$$

Therefore, by substituting Eq. H and Eq. J into Eq. F, $$Cp(s) = HGa(s) \cdot (Up(s) + Ut(s) \cdot Dtc(s)) + HGc(s) \cdot (Up(s) \cdot Dpc(s) + Ut(s)) = Up(s) \cdot (HGa(s) + HGc(s) \cdot Dpc(s)) + Ut(s) \cdot (HGa(s) \cdot Dtc(s) + HGc(s)) \quad \text{(Eq. K)}$$

and, by substituting Eq. H and Eq. J into Eq. G, $$Ct(s) = HGb(s) \cdot (Up(s) + Ut(s) \cdot Dtc(s)) + HGd(s) \cdot (Up(s) \cdot Dpc(s) + Ut(s)) = Up(s) \cdot (HGb(s) + HGd(s) \cdot Dpc(s)) + Ut(s) \cdot (HGb(s) \cdot Dtc(s) + HGd(s)). \quad \text{(Eq. L)}$$

If there are to be no fluctuations in melt pressure as a result of changes in zone temperature set points, the factor of Ut(s) in Eq. K, $(HGa(s) \cdot Dtc(s) + HGc(s))$, should equal zero. Thus, $$HGa(s) \cdot Dtc(s) + HGc(s) = 0,$$

or $$Dtc(s) = -Hgc(s)/(HGa(s)) \quad \text{(Eq. M)}$$

Hence, the interaction controller Dtc(s) should be designed in accordance with the relationship shown in Eq. M.

Similarly, if there are to be no fluctuations in melt temperature as a result of changes in screw speed, the factor of Up(s) in Eq. L, $(HGb(s) + HGd(s) \; Dpc(s))$, should equal zero.
Thus, $$HGb(s) + HGd(s) \cdot Dpc(s) = 0,$$

or $$Dpc(s) = -HGb(s)/(HGd(s)) \quad \text{(Eq. N)}$$

Hence the interaction controller Dpc(s) should be designed in accordance with the relationship shown in Eq. N.

The interaction controllers Dtc(s) and Dpc(s) can only be designed in accordance with the above relationships if they are physically realizable controllers. In most extruder systems, the interaction controller Dtc(s) designed according to Eq. M is physically realiazable since, if a change is made in the set points of zones 2 and 3, the melt temperature transducer does not respond to this change for several minutes. Thus, there is adequate time for the controller Dtc(s) to adjust the melt pressure as a result of changes in the zone temperature set points. However, the interaction controller Dpc(s) designed according to Eq. N is not physically realizable since, if a change is made in screw speed, the melt temperature transducer detects this change almost immediately and there is no way that the zone temperatures can be adjusted to immediately cancel the effect on the melt temperature. Thus, the present invention provides two interaction controllers, one which cancels any fluctuations in melt pressure as a result of changes in zone temperature set points, and another which minimizes the fluctuations in melt temperature as a result of changes in screw speed.

Although analog elements can be utilized to implement the control system according to the present invention, a programmed general purpose digital microcomputer, such as a Model LSI-11 manufactured by Digital Equipment Corporation, 146 Main Street, Maynard, Massachusetts 01754, can be utilized. Thus, the functions of the controllers of the melt pressure control means 33, the melt temperature control means 46 and the zone temperature control means 51 can be programmed and an input/output device such as a teletype can be utilized to enter the desired set points. Signals from the transducers can be inputted utilizing the sampled data technique and the control signals for the screw drive control means 37 and the heating means 19 and cooling means 53 can be converted to stepped analog signals. The use of a digital computer also has the advantage of easily accommodating changes in the extruder apparatus through reprogramming for more or less controllers.

In summary, the present invention concerns a temperature control means for an extruder apparatus having a barrel including a rotatable screw for moving extrusion material from an inlet to an outlet of the barrel and through a die attached to the barrel at the outlet. The temperature control means comprises means for generating a temperature set point signal; means for generating a signal representing the actual temperature to be controlled at a point in the extruder apparatus; a first controller means responsive to the temperature set point signal for generating a first temperature control signal; means for generating an error signal representing the difference between the temperature set point signal and the actual temperature signal; a second controller means responsive to the error signal and the first temperature control signal for generating a second temperature control signal; and means responsive to the second temperature control signal for controlling the temperature at the point in the extruder apparatus. Typically, the first controller means is a feedforward controller having a relatively low sensitivity to changes in the temperature set point signal while the second controller is a feedback controller having a relatively high sensitivity to changes in the actual temperature signal. The actual temperature can be either the melt temperature of the extrusion material at a point adjacent the outlet of the barrel or it can be the temperature of the extrusion material at a point intermediate the inlet and outlet of the barrel.

The extruder control system can also include a means for generating a signal representing the actual melt pressure and a means for generating a melt pressure set point signal. A melt pressure control means is responsive to the actual melt pressure signal and the melt pressure set point signal to generate a melt pressure control signal. The melt pressure control signal and the melt temperature control signal are inputted to a means which generates a speed control signal to a speed control means for controlling the speed of the screw. Another means is also responsive to the melt temperature control signal and the melt pressure control signal for generating a temperature control signal to a means for controlling the melt temperature.

The speed control signal generating means can include an interacting controller for generating a component of the temperature control signal whereby fluctuations in the melt temperature due to changes in the melt pressure are minimized. The temperature signal generating means can include an interaction controller responsive to the melt temperature control signal for generating a component of the speed control signal whereby fluctuations in the melt pressure due to changes in the melt temperature are minimized.

The present invention also concerns a method for controlling the temperature of an extrusion material in an extruder apparatus having a barrel including a rotatable screw for moving the extrusion material from an inlet to an outlet of the barrel comprising the steps of generating a signal representing the actual melt pressure of the extrusion material; generating a melt pressure set point signal representing the desired melt pressure; generating a melt pressure control signal in response to the actual melt pressure signal and the melt pressure set point signal, generating a signal representing the actual melt temperature of the extrusion material; generating a melt temperature set point signal representing the desired melt temperature; generating a melt temperature control signal in response to the actual melt temperature signal and the melt temperature set point signal; generating a speed control signal in response to the melt pressure control signal and the melt temperature control signal; controlling the speed of the screw in response to the speed control signal; generating a temperature control signal in response to the melt temperature control signal and the melt pressure control signal; and controlling the temperature of the extrusion material in response to the temperature control signal.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. In an extruder apparatus having a barrel including a rotatable screw for moving extrusion material from an inlet to an outlet of the barrel and through a die attached to the barrel at the outlet, a temperature control means comprising:

means for generating a temperature set point signal;

means for generating a signal representing the actual temperature to be controlled at a point in the extruder apparatus;

a first controller means responsive to said temperature set point signal for generating a first temperature control signal;

means for generating an error signal representing the difference between said temperature set point signal and said actual temperature signal;

a second controller means responsive to said error signal and said first temperature control signal for generating a second temperature control signal; and means responsive to said second temperature control signal for controlling the temperature at said point in the extruder apparatus.

2. A temperature control means according to claim 1 wherein said first controller means is a feedforward controller having a relatively low sensitivity to changes in said temperature set point signal.

3. A temperature control means according to claim 1 wherein said second controller means is a feedback controller having a relatively high sensitivity to changes in said actual temperature signal.

4. A temperature control means according to claim 1 wherein said actual temperature is the melt temperature of the extrusion material at a point adjacent the outlet of the barrel.

5. A temperature control means according to claim 1 wherein said actual temperature is the temperature of the extrusion material measured at a point intermediate the inlet and outlet of the barrel.

6. In an extruder apparatus having a barrel including a rotatable screw for moving extrusion material from an inlet to an outlet of the barrel and means for controlling the temperature of the extrusion material in response to temperature control signals, a temperature control signals generating means comprising:

means for generating a signal representing the actual melt temperature of the extrusion material adjacent the barrel outlet;

means for generating a melt temperature set point signal;

means for generating a melt temperature error signal representing the difference between said actual melt temperature signal and said melt temperature set point signal;

a first controller means responsive to said melt temperature set point signal for generating a first melt temperature control signal;

a second controller means responsive to said melt temperature error signal and said first melt temperature control signal for generating a second melt temperature control signal;

a third controller means responsive to said second melt temperature control signal for generating a first zone temperature control signal;

means for generating a signal representing the actual temperature of the extrusion material at a zone along the barrel;

means for generating a zone temperature error signal representing the difference between said second melt temperature control signal and said actual zone temperature signal; and a fourth controller means responsive to said zone temperature error signal and said first zone temperature control signal for generating a second zone temperature control signal as one of the temperature control signals whereby said zone temperature is controlled to maintain said actual melt temperature at said melt temperature set point.

7. In an extruder apparatus having a barrel including a rotatable screw for moving extrusion material from an inlet to an outlet of the barrel, means for controlling the speed of the screw in response to a speed control signal, and means for controlling the melt temperature of the material in response to a temperature control signal, a control means comprising:

means for generating a signal representing the actual melt pressure of the extrusion material;

means for generating a melt pressure set point signal;

means responsive to said actual melt pressure signal and said melt pressure set point signal for generating a melt pressure control signal;

means for generating a signal representing the actual melt temperature of the extrusion material;

means for generating a melt temperature set point signal;

means responsive to said actual melt temperature signal and said melt temperature set point signal for generating a melt temperature control signal;

means responsive to said melt pressure control signal and said melt temperature control signal for generating the speed control signal; and means responsive to said melt temperature control signal and said melt pressure control signal for generating the temperature control signal.

8. A control means according to claim 7 wherein said temperature control signal generating means includes an interaction controller means responsive to said melt temperature control signal for generating a component of said speed control signal whereby fluctuations in said melt pressure due to changes in said melt temperature are minimized.

9. A control means according to claim 7 wherein said melt pressure control signal generating means includes means for generating a melt pressure error signal representing the difference between said actual melt pressure signal and said melt pressure set point signal and a feedback controller responsive to said melt pressure error signal for generating said melt pressure control signal.

10. A control means according to claim 7 wherein said speed control signal generating means includes an interaction controller means responsive to said melt pressure control signal for generating a component of said temperature control signal whereby fluctuations in said melt temperature due to changes in said melt pressure are minimized.

11. A control means according to claim 10 wherein said melt temperature control signal generating means includes means for generating a melt temperature error signal representing the difference between said actual melt temperature signal and said melt temperature set point signal, a first controller means responsive to said melt temperature set point signal for generating a melt temperature set point control signal, and a second controller means responsive to said melt temperature error signal and said melt temperature set point control signal for generating said melt temperature control signal.

12. A control means according to claim 11 wherein said first controller means is a feedforward controller having a relatively low sensitivity to changes in said melt temperature set point signal.

13. A control means according to claim 11 wherein said second controller means is a feedback controller having a relatively high sensitivity to changes in said actual melt temperature signal.

14. In an extruder apparatus having a barrel including a rotatable screw for moving extrusion material from an inlet to an outlet of the barrel and through a die attached to the barrel at the outlet; means for controlling the speed of the extruder screw in response to a speed control signal; at least one temperature controlling means individual to a zone defined along the barrel being responsive to a zone temperature control signal for controlling the temperature in the respective zone; means for generating a signal representing the actual melt pressure of the extrusion material adjacent the barrel outlet; means for generating a melt pressure set point signal; means responsive to the actual melt pressure signal and the melt pressure set point signal for generating the speed control signal; means for generating a signal representing actual temperature in the zone; means for generating a zone temperature set point signal and means responsive to the actual zone temperature signal and the zone temperature set point signal for generating the zone temperature control signal, the zone temperature control signal generating means comprising:

a zone temperature feedforward controller responsive to the zone temperature set point signal for generating an output signal;

means for generating a zone temperature error signal representing the difference between the zone temperature set point signal and the actual zone temperature signal; and a zone temperature feedback controller responsive to said feedforward controller output signal and said error signal for generating the zone temperature control signal.

15. An apparatus according to claim 14 wherein said means for generating the zone temperature set point signal includes means for generating a melt temperature set point signal, means for generating a signal representing the actual melt temperature of the extrusion material adjacent the barrel outlet, and means responsive to said melt temperature set point signal and said actual melt temperature signal for generating the zone temperature set point signal.

16. An apparatus according to claim 15 wherein said means for generating the zone temperature set point signal includes a melt temperature feedforward controller responsive to said melt temperature set point signal for generating an output signal, means for generating a melt temperature error signal representing the difference between the melt temperature set point signal and the actual melt temperature signal, and a melt temperature feedback controller responsive to said melt temperature feedforward controller output signal and said melt temperature error signal for generating the zone temperature set point signal.

17. An apparatus according to claim 16 wherein the speed control signal generating means includes means for generating a melt pressure error signal representing the difference between the melt pressure set point signal and the actual melt pressure signal and a melt pressure feedback controller responsive to said melt pressure error signal for generating the speed control signal.

18. An apparatus according to claim 15 wherein the speed control signal generating means includes means for generating a melt pressure error signal representing the difference between the melt pressure set point signal and the actual melt pressure signal, a melt pressure feedback controller responsive to said melt pressure error signal for generating an output signal, an interaction controller responsive to said melt pressure feedback controller output signal for generating a melt pressure interaction signal and means responsive to said melt pressure feedback controller output signal and a melt temperature interaction signal for generating the speed control signal and wherein the zone temperature set point signal generating means includes means for generating a melt temperature error signal representing the difference between the melt temperature set point signal and the actual melt temperature signal, a melt temperature feedforward controller responsive to said melt temperature set point signal for generating an output signal, a melt temperature feedback controller responsive to said melt temperature error signal and said melt temperature feedforward controller output signal for generating an output signal, an interaction controller responsive to said melt temperature feedback controller output signal for generating said melt temperature interaction signal and means responsive to said melt temperature feedback controller output signal and said melt pressure interaction signal for generating the zone temperature set point signal.

* * * * *